(12) United States Patent
Sanaboyina et al.

(10) Patent No.: US 10,657,516 B2
(45) Date of Patent: *May 19, 2020

(54) ENABLING SECURE TRANSACTIONS WITH AN UNDERPOWERED DEVICE

(71) Applicant: PAYPAL, INC., San Jose, CA (US)

(72) Inventors: Venkata Kalyan Sanaboyina, Redwood City, CA (US); Yifan Li, San Jose, CA (US); Aalok Johar, Campbell, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,054

(22) Filed: Nov. 13, 2018

(65) Prior Publication Data

US 2019/0251547 A1    Aug. 15, 2019

Related U.S. Application Data

(63) Continuation of application No. 15/350,527, filed on Nov. 14, 2016, now Pat. No. 10,127,546, which is a
(Continued)

(51) Int. Cl.
| | |
|---|---|
| *G06Q 20/32* | (2012.01) |
| *G06Q 20/40* | (2012.01) |
| *G06K 19/06* | (2006.01) |
| *G06F 21/57* | (2013.01) |
| *G06F 21/62* | (2013.01) |
| *G06F 21/88* | (2013.01) |
| *G06F 21/36* | (2013.01) |
| *G06F 21/81* | (2013.01) |
| *G06F 1/30* | (2006.01) |

(Continued)

(52) U.S. Cl.
CPC ......... *G06Q 20/3274* (2013.01); *G06F 1/263* (2013.01); *G06F 1/30* (2013.01); *G06F 21/36* (2013.01); *G06F 21/57* (2013.01); *G06F 21/6245* (2013.01); *G06F 21/81* (2013.01); *G06F 21/88* (2013.01); *G06K 19/06037* (2013.01); *G06K 19/06112* (2013.01); *G06Q 20/3224* (2013.01); *G06Q 20/3226* (2013.01); *G06Q 20/405* (2013.01); *H04W 4/02* (2013.01); *G06F 1/3212* (2013.01); *G06F 2221/034* (2013.01); *G06F 2221/2117* (2013.01); *Y02D 10/174* (2018.01)

(58) Field of Classification Search
CPC . G06K 19/00; G06K 7/10; G06K 9/22; G06F 17/00
USPC .......... 235/487, 375, 462.01, 472.01, 462.45
See application file for complete search history.

(56) References Cited

U.S. PATENT DOCUMENTS

2007/0181678 A1    8/2007   Nilsson et al.
2009/0248883 A1   10/2009   Suryanarayana et al.
(Continued)

*Primary Examiner* — Edwyn Labaze
(74) *Attorney, Agent, or Firm* — Haynes and Boone LLP

(57) ABSTRACT

Methods, systems, and computer program products for providing secure transactions for a device with limited functionality are disclosed. For example, a computer-implemented method may include presenting an encoded image identifying a form of payment on a display of a computing device in response to detecting a condition limiting a functionality of the device, maintaining the presentation of the encoded image on the display in response to the detected condition, and removing the presentation of the encoded image from the display in response to determining that the detected condition is no longer detected.

20 Claims, 5 Drawing Sheets

Related U.S. Application Data continuation of application No. 14/664,769, filed on Mar. 20, 2015, now Pat. No. 9,495,674.

(51) Int. Cl.
*G06F 1/26* (2006.01)
*H04W 4/02* (2018.01)
*G06F 1/3212* (2019.01)

(56) References Cited

U.S. PATENT DOCUMENTS

| | | |
|---|---|---|
| 2011/0148750 A1 | 6/2011 | Ayala |
| 2011/0234617 A1 | 9/2011 | Watanabe |
| 2011/0264899 A1 | 10/2011 | Evans et al. |
| 2011/0270618 A1 | 11/2011 | Banerjee et al. |
| 2011/0287726 A1 | 11/2011 | Huang |
| 2012/0074232 A1 | 3/2012 | Spodak et al. |
| 2012/0185317 A1 | 7/2012 | Wong |
| 2012/0217971 A1 | 8/2012 | Deluca |
| 2012/0303520 A1 | 11/2012 | Huang |
| 2013/0002441 A1 | 1/2013 | Khan |
| 2015/0015511 A1 | 1/2015 | Kwak et al. |
| 2015/0356898 A1 | 12/2015 | Jeon et al. |

ENABLING SECURE TRANSACTIONS WITH AN UNDERPOWERED DEVICE

CROSS REFERENCE TO RELATED APPLICATION

The present application is a continuation of U.S. patent application Ser. No. 15/350,527, filed Nov. 14, 2016, which is a continuation of U.S. patent application Ser. No. 14/664,769, filed Mar. 20, 2015, which issued as U.S. Pat. No. 9,495,674 on Nov. 15, 2016, all of which are hereby incorporated by reference in their entirety.

BACKGROUND

Field of the Invention

The present invention generally relates to systems and methods for maintaining some operability for an electronic device when lacking a sufficient power source, and more specifically to systems and methods for allowing a device to conduct secure electronic funds transfers when the device lacks sufficient battery power for normal operation or is unpowered.

Related Art

Computer systems and networks can facilitate the tasks of buying, selling and transferring goods and services in retail and other marketplaces. As personal electronic devices have become more and more ubiquitous, these personal electronic devices have started replacing traditional methods of paying for goods and services. For example, instead of conducting payments with cash or credit cards, a smartphone and/or a smart watch with NFC technology and a payment application can be used for facilitating fund transfers and payments. For the most part, having a multifunction smartphone can replace most if not all of the objects generally kept on a person, such as identification, cash, credit cards, insurance cards, wallets, and/or the like. However, there tends to be at least one major flaw to having an electronic device replace their non-electronic counter parts. All electronic devices require a power source, often times a battery, to run properly. When the electronic device lacks a power source, such as when a battery is drained, the device becomes mostly useless and unable to function. If a person was relying on the electronic device as a replacement for cash and/or credit cards, the person would be unable to conduct any purchases once its battery runs out.

Thus, a system and method which allows for certain functionality of the electronic device even when lacking a power source would be desirable.

Figure 1:
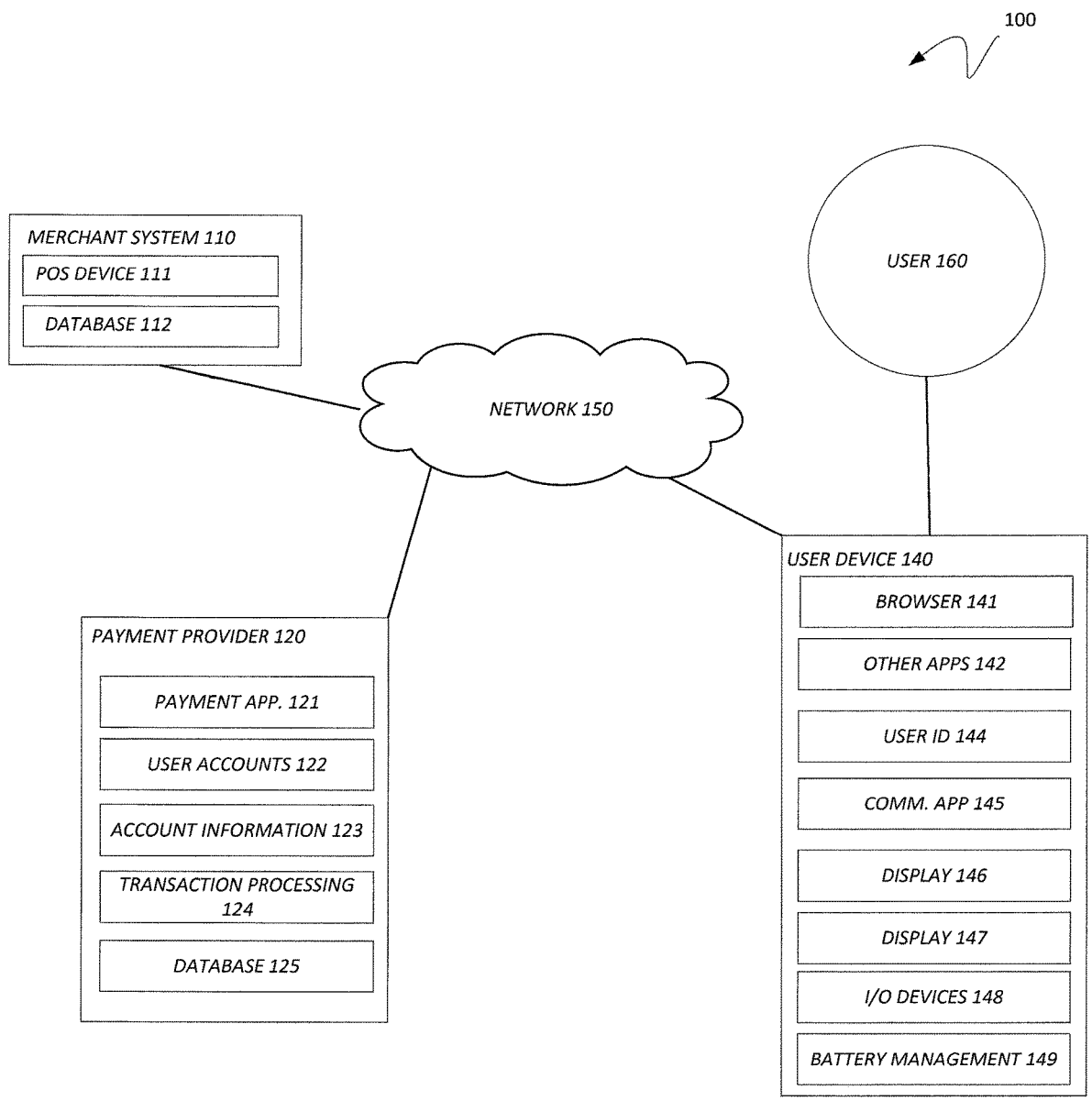
FIG. 1 is a block diagram of an illustrative networked system suitable for enabling secure monetary transactions with an unpowered and/or underpowered device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, a display (such as a static printed sticker or a dynamically changing e-ink display) on a user mobile device shows a code that can be scanned or otherwise captured by a merchant. Once scanned, the user may provide or enter an authenticator, such as a PIN or password associated with a user account, on a merchant device. A payment service provider can then process the payment. In another embodiment, the code may have restrictions or limitations as set by the user and/or the payment service provider. In another embodiment, the code is generated for display when the user mobile device is detected as running low on power. Thus, a user is still able to make a payment with an unpowered or underpowered device.

In some embodiments, a user device related to a payment account may display a barcode for enabling product purchasing when the device is low on power or about to be shut off and/or in response to being low powered or a request to shut the device off. The barcode configured such that it is illegible to the general population, but have account information embedded into the barcode. The barcode may be scanned or an image of the barcode may be captured by a merchant providing a product or service and sent to a payment provider for payment. The payment provider may extract data from the barcode to identify an account belonging to the user and manage a funds transfer from a user account to an account for the merchant as payment for a service or product. The merchant, user device, and/or payment provider may implement one or more security measures to prevent the bar code from being used fraudulently. Some examples of the security measures that may be implemented include price limitations, product limitations, geographical limitations, time of day limitations, number of use limitations, allowance limitations, limitations on which merchants are authorized for payment, and/or the like. In some examples, the security measures may include user authentication through the request of a PIN, answer to a security question, biometric signature, and/or the like. In some examples, the security measures may include fraud detection such as identifying tampering, analyzing user purchase histories for uncharacteristic purchases, and/or the like.

In some examples, some of the security measures implemented by the user device may be communicated through the barcode. For example, the barcode may have data embedded into it making up a list of authorized merchants, purchase history, payment limitations, indication that the device has been tampered with, and/or the like. Some of the security measures may be manually selected, entered, and/or chosen by the user.

In some examples, some of the security measures may be implemented by the merchant and/or payment providers. The security measures may be account setting set by the user. In some examples, when a payment provider or a merchant receives a purchase request and a bar code for identifying a user account, the merchant and/or payment provider may check whether the purchase request is authorized based on the account settings for the user account.

In some embodiments of the present disclosure, a payment device including a battery, a display, and a processor is disclosed. In some examples, the processor is configured to generate an optical machine-readable representation of data, the data including an identifier for a payment account, and displays the optical machine-readable representation of data on the display in response to a charge of the battery.

In some embodiments of the present disclosure, a system for processing payments using an optical machine-readable representation of data is disclosed. In some examples, the system includes a server. In some examples, the server includes one or more processors coupled to a memory and operable to read instructions from the memory to perform the steps of receiving an optical machine-readable representation of data, a payment request for a purchase, and a merchant identifier, extracting a payment account identifier from the optical machine-readable representation of data, and determining a use limitation for the optical machine-readable representation of data limiting the ability to conduct a purchase using the optical machine-readable representation of data and determining a use limitation for the optical machine-readable representation of data limiting the ability to process the payment request on behalf of a merchant identified by the merchant identifier.

In some embodiments of the present disclosure, a method for securely implementing optical machine-readable representation of data for purchases is disclosed. In some examples the method includes generating an image including a legible portion and an optical machine-readable representation of data, the legible portion being a security question, and displaying the image on a display when a charge of a power source falls below a predetermined limit.

While the various examples disclosed herein focus on particular aspects regarding enabling monetary transactions with an unpowered and/or underpowered device, it will be understood that the various inventive principles and embodiments disclosed herein can be applied to other types of arrangements as well. For example, some of the embodiments may be implemented through a device printing images on paper.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium may have computer readable and executable code for instructing one or more processors to perform any of the methods disclosed herein.

Beginning with FIG. 1, a block diagram is shown of a networked system 100 suitable for implementing one or more processes for enabling secure monetary transaction with an unpowered and/or underpowered device. Networked system 100 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a merchant system 110, a payment provider server 120, and a user device 140 in communication over a network 150. A user 160, such as a consumer, may utilize device 140 to interact with other devices such as, merchant system 110, payment provider server 120, and/or third-party server 130.

Merchant system 110 may be maintained, for example, by a merchant, seller, or a marketplace offering various products and/or services. Merchant system 110 may be set up to handle payments at a brick and mortar store selling goods and/or services. For example, merchant system 110 may be set up for a grocery store, gas station, convenience store, department store, mall, clothing store, and/or the like.

Merchants system 110 may be in communications with and/or linked with a payment provider, such as payment provider server 120, to conduct currency transfers when a product is purchased. Generally, merchant system 110 may be maintained by anyone or any entity that receives money, which includes charities as well as banks and retailers.

Merchant system 110 may have a database 112 which may include information regarding merchant and/or user accounts. Database 112 may maintain an inventory of products available for sale, donation, exchange, and/or the like. Products may include, but are not limited to, physical goods, digital goods, services, commodities, charities and/or the like (products may also be referred to as items). Database 112 may contain product descriptions which may include textual descriptions of products, information regarding the merchant (e.g. merchant name, location, type, etc.), receipts for purchases, and/or the like.

Merchant system 110 may also include a point of sales (POS) device 111 which may be configured to facilitate the purchase by user 160 of goods or services with user device 140. POS device 111 may be configured to accept payment information from or on behalf of user 160 through payment service provider server 120 over network 150 and/or user device 140. In some embodiments, POS device 111 may receive information from user device 140 in manners other than through network 150, for example through NFC and/or a scanner. In some embodiments, POS device 111 may receive information from user device 140 using a scanner, such as a bar code scanner, to scan an image display by user device 140. In some embodiments, POS device 111 may include a scanner for scanning and/or reading optical machine-readable representations of data and/or images. In some embodiments, the POS system may have an imaging device for capturing images of optical machine-readable representations of data.

In some examples, POS device 111 may receive and process a payment confirmation from payment provider server 120, as well as transmit transaction information to the payment provider and receive information from the payment provider (e.g., a transaction ID). POS device 111 may also be configured to receive payment via a plurality of payment methods including cash, credit cards, debit cards, checks, money orders, and/or the like. In some embodiments, the POS device 111 may have a wireless charging device for wirelessly charging devices, such as user device 140, for when devices are under powered and/or lack sufficient battery power/charge to function.

Payment provider server 120 may be maintained, for example, by an online payment service provider which may provide payment between user 160 and the operator of merchant system 110, another user, and/or a merchant. Payment provider server 120 may include one or more payment applications 121 which may be configured to interact with merchant system 110 and/or user device 140 over network 150 to facilitate the purchase of goods and/or services, communicate/display information, and send payments by user 160 of user device 140.

Payment provider server 120 may also maintain a plurality of user accounts 122, each of which may include account information 123 associated with consumers, merchants, and funding sources, such as banks and/or credit card companies. For example, account information 123 may include private financial information of users of devices such as account numbers, passwords, device identifiers, user names, phone numbers, credit card information, bank information, place of residence, mailing addresses, shipping locations, and/or other information which may be used to facilitate transactions by user 160. Payment application 121 may be configured to interact with merchant system 110 on behalf of user 160 during a transaction with POS device 111 to track and manage purchases made by users and which funding sources are used. Payment application 121 may be configured to determine the existence of and to manage accounts for user 160, as well as create new accounts if necessary. Payment application 121 may be configured to execute one or more payment transactions in response to receiving and/or recognizing a purchase request from user 160, device 140, and/or merchant system 110.

A transaction processing application 124, which may be part of or separate from payment application 121, may be configured to receive information from user device 140 and/or merchant system 110 for processing and storage in a database 125. Transaction processing application 124 may include one or more applications for processing payment information from user 160 and/or merchant system 110 using various selected funding instruments. As such, transaction processing application 124 may store details of an order from individual users, including a funding source used, available credit options, and/or the like. Transaction processing application 124 may be configured to execute one or more transactions in response to a user purchasing a product through merchant system 110.

In some embodiments, payment provider server 120 may be maintained by a payment service provider, such as PayPal, Inc. of San Jose, Calif. A user 160 may utilize user device 140 to initiate a payment transaction, receive a transaction approval request, and/or reply to a transaction approval request. Note that transaction, as used herein, refers to any suitable action performed using the user device, including payments, transfer of information, display of information, purchases, sales, online listings, and/or the like.

User device 140, merchant system 110, and payment provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Network 150 may be implemented as a single network or a combination of multiple networks. For example, in various embodiments, network 150 may include the Internet or one or more intranets, landline networks, wireless networks, and/or other appropriate types of networks.

User device 140 may be implemented using any appropriate hardware and software. For example, in one embodiment, user device 140 may be implemented as a personal computer (PC), a smart phone, personal digital assistant (PDA), laptop computer, and/or other types of computing devices capable of transmitting, receiving, creating, and/or displaying machine-readable data, such as an iPhone™ from Apple™.

User device 140 may include one or more browser applications 141 which may be used, for example, to provide a convenient interface to permit user 160 to view a webpage. In some examples, browser application 141 may be implemented as a web browser configured to view and/or interact with a webpage provided by payment provider 120 to set up an account and/or change account settings.

User device 140 may further include other applications 142 as may be desired in particular embodiments to provide desired features to user device 140. For example, other applications 142 may include security applications for implementing client-side security features, programmatic client applications for interfacing with appropriate APIs over network 150, or other types of applications.

Applications 142 may also include applications for browsing content, which may include applications for email, texting, voice, IM, and/or the like. Applications 142 may allow user 160 to send and receive emails, calls, and texts. Applications 142 may enable user 160 to play games, read digital books, communicate, transfer information, make payments, and/or the like.

User device 140 may include one or more user identifiers 144 which may be implemented, for example, as operating system registry entries, user identifiers associated with hardware of user device 140, and/or other appropriate identifiers, such as used for payment, user, and/or device authentication. In some embodiments, user device 140 may include a communications application 145 with associated interfaces that enables user device 140 to communicate within system 100. In some embodiments, user identifier 144 may be information that may be used by a payment service provider to associate user 160 with a particular account maintained by the payment provider.

Display 146 may include a screen that displays information and/or content to user 160. Display 146 may be a mobile device display, monitor, e-ink display, projection display that projects images onto a transparent, partially transparent or opaque structure, or may include any other suitable display technologies.

In some embodiments, user device 140 may have a secondary display 147. Display 147, similar to display 146, may be a mobile device display, monitor, e-ink display, projection display that projects images onto a transparent, partially transparent or opaque structure, or may include any other suitable display technologies. In some embodiments, secondary display 147 may require less power than display 146.

User device 140 may include one or more input/output devices 148 (e.g., a keypad, a keyboard, a touch sensitive component, a microphone, a camera, and the like). In some examples, display 146 may be a touch screen that doubles as one of the input/output devices 148. User device 140 may monitor user input on the touch screen, on any other touch-sensitive device (e.g., a touchpad on a laptop), and/or other input components (e.g., a mouse) and may recognize user input for association with transactions, and/or to activate actuatable elements for certain functions (e.g., purchase transactions, payment transactions, sales transactions, and listing transactions). In some embodiments, user device 140 may have a battery management system 149. Battery management system may connect to a battery of user device 140 (not shown) which may gather information regarding battery life, battery charge, power, voltage, current, and/or the like.

One or more of merchant system 110, payment provider server 120, and user device 140 may be used to execute any suitable transaction in response to user 160 indicating a desire to purchase a product.

Figure 2:
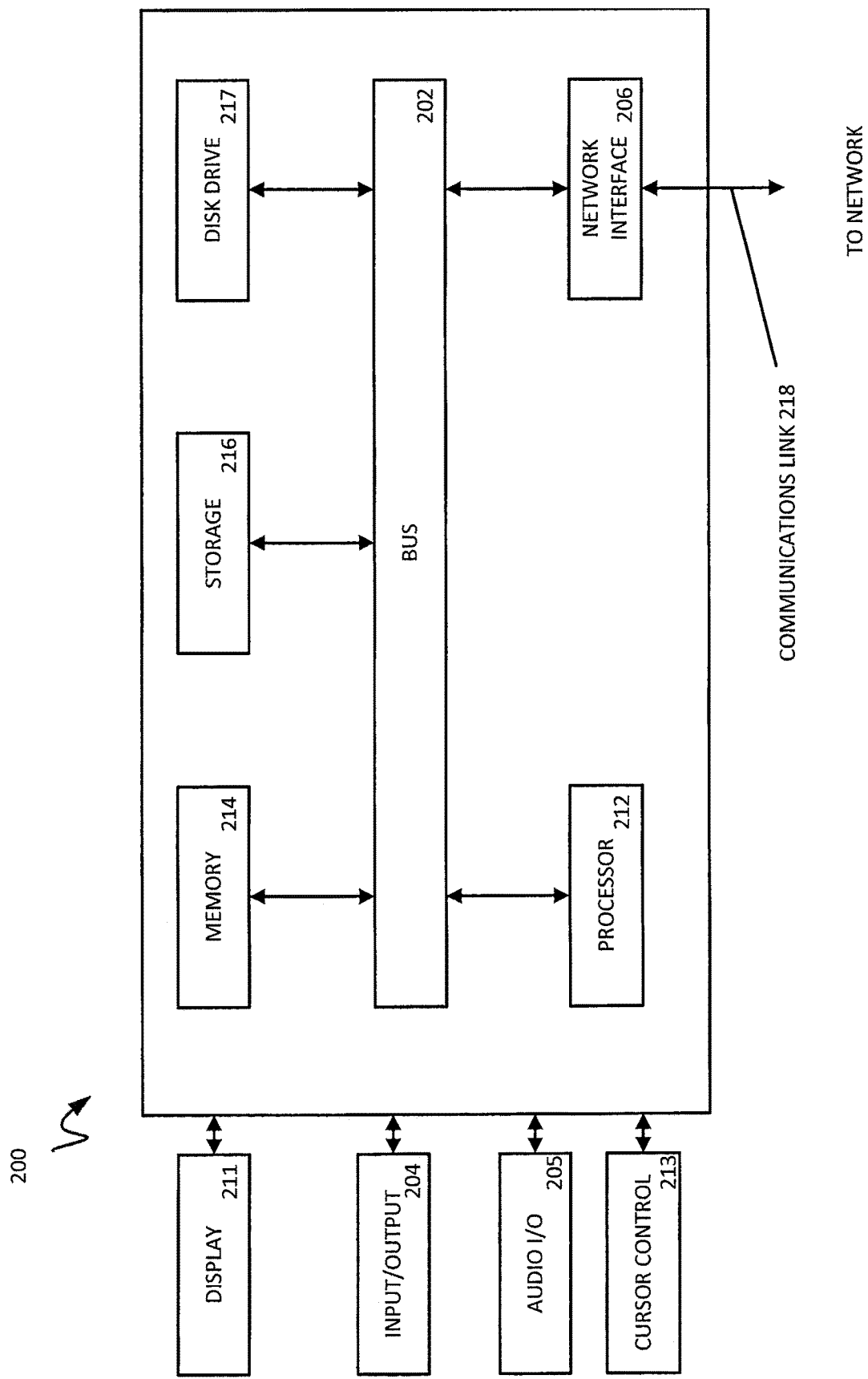
FIG. 2 is a block diagram of an illustrative computer system suitable for implementing one or more components in FIG. 1 according to an embodiment.

FIG. 2 is a block diagram of a computer system 200 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant, third-party server, and/or payment provider may utilize a network computing device (e.g., a network server) capable of communicating with the network. It should be appreciated that each of the devices utilized by users, merchants, and payment providers may be implemented as computer system 200 in a manner as follows.

Computer system 200 includes a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, or a payment provider server via a network. In one embodiment, the transmission is wireless, although other transmission mediums and methods may also be suitable. A processor 212, which can be a micro-controller, digital signal processor (DSP), or other processing component, processes these various signals, such as for display on computer system 200 or transmission to other devices via a communication link 218. Processor 212 may also control transmission of information, such as cookies, IP addresses, and/or instructions to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or electromagnetic waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may performed instruction sequences to practice the present disclosure in coordination with one another.

Figure 3:
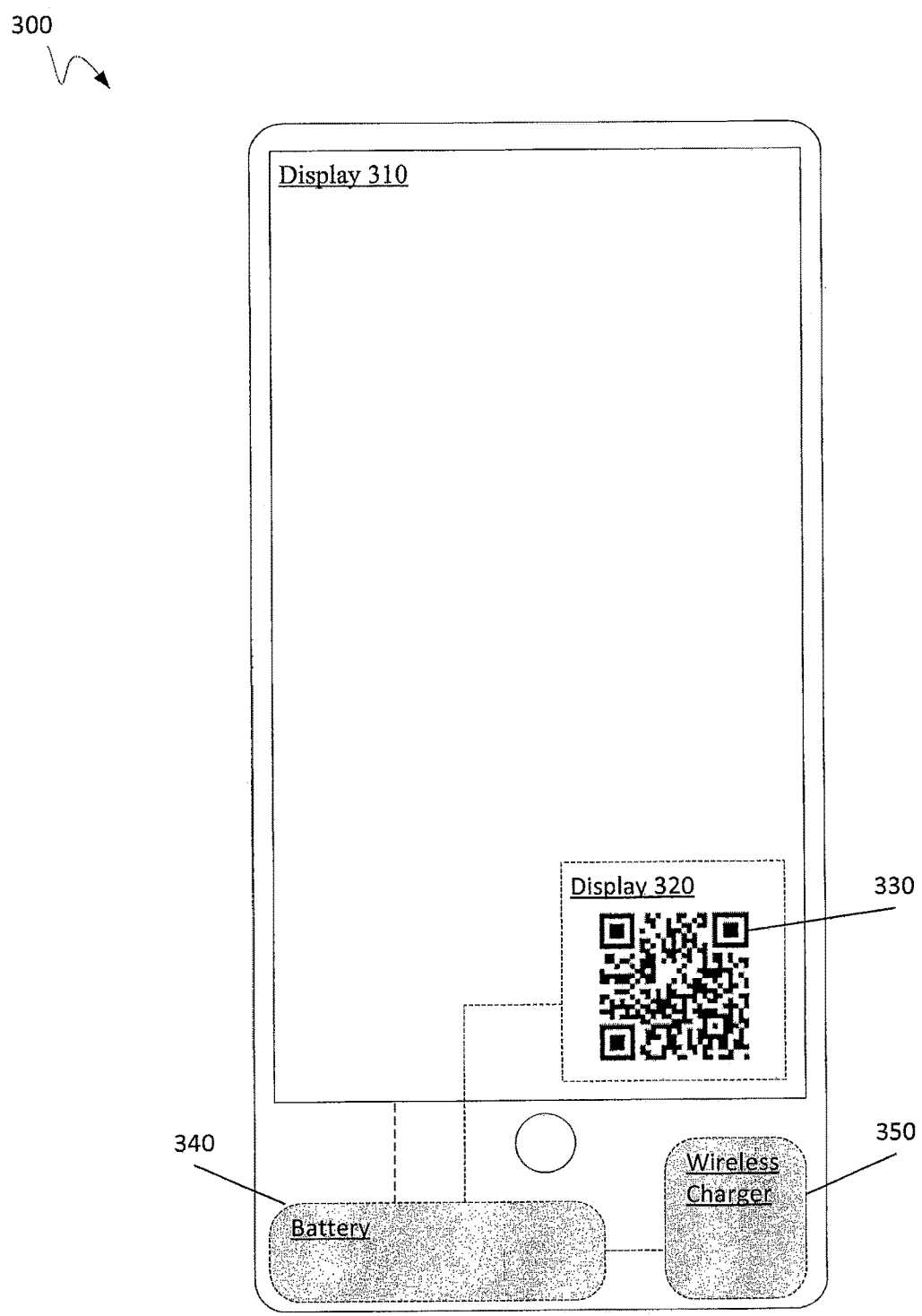
FIG. 3 is a simplified illustration of an exemplary user device for implementing one or more embodiments of a secure monetary transaction when unpowered and/or underpowered.

FIG. 3 is a simplified illustration of a user device 300 suitable for implementing one or more embodiments of the present disclosure. In various implementations, user device 300 may comprise a personal computing device (e.g., smart phone, computing tablet, personal computer, PDA, etc.) that may be battery powered. In some embodiments, user device 300 may be a computer system such as computing system 200 of FIG. 2. Device 300 may have a display 310 and a display 320. In some embodiments, display 310 may be a display that is transparent when powered and/or unpowered. In some examples, a user would be able to see through display 310 to see display 320 underneath. For example, display 310 may be a transparent light emitting diode (LED) display, a transparent organic LED (OLED) display, a transparent liquid crystal display (LCD), and/or the like. In some embodiments display 310 may be an opaque display and display 330 may be placed in a separate viewable location, such as on the back of the device.

Display 320 may be a bistable display, such as an e-ink display. As a bistable display, display 320 may change when connected to a power source, but also maintain an image without a power source. This would be useful for displaying an image, such as optical machine-readable representation of data 330, when the power supply is unable to power the device, for example, when a battery has mostly and/or completely discharged. In some examples, optical machine-readable representation of data 330 may be one or more linear barcodes such as a universal product code (UPC), code 128, European article numbers (EAN), Japanese article number (JAN), pharmacode, and/or the like. In some examples, optical machine-readable representation of data 330 may be one or more 2D and/or matrix barcodes such as a QR code, Qode, Nexcode, Shotcode, SPARQCode, PDF417, MaxiCode, High Capacity Color Barcode, EZ code, Data Matrix, CrontoSign, CyberCode, Aztec Code, and or the like. In some examples, there may be a benefit to using a matrix barcode over a linear barcode for the sake of capacity and/or obscurity. For example, a QR code can store up to 7089 characters whereas a UPC is limited to 12 numerical digits. Additionally, it is significantly more difficult for a human to learn how to read a QR code than simple linear barcodes. In some examples, the barcodes/optical machine-readable representation of data may include error correcting properties such that the barcode/optical machine-readable representation of data can still be read/recreated by a computer even when some of the barcode/optical machine-readable representation of data is missing, covered, damaged, and/or illegible. In some examples, the optical machine-readable representation of data may be illegible to the general human populous. In some examples, the optical machine-readable representation of data may implement a legible portion that may use normal alpha numeric characters and/or symbols used in a written language.

The above list of barcodes are only provided as an example and are not meant to be exhaustive of the types of barcodes or the types of optical machine-readable representations of data. Any suitable optical machine-readable representations of data may be used. Furthermore, as technology develops there may be other optical machine-readable representations of data that may be suitable for implementing one or more of the embodiments in this disclosure, all of which are contemplated herein.

In some embodiments, device 300 may have a single display. The display may be bistable or have a lower power configuration such that an image can be displayed when the power source is mostly drained and cannot maintain the rest of the functionality of device 300 (e.g. processor, wireless communications, etc.).

In some embodiments, device 300 may have one or more power sources powering display 310 and/or 320, such as a battery 340. In some embodiments, battery 340 may be configured to power display 310 and/or 320 when another power source powering device 300 fails, has insufficient power, or is below a certain/predetermined charge/battery life. In some embodiments, battery 340 may have insufficient power to power the rest of functionalities of device 300, such as a CPU (not shown).

In some embodiments, device 300 may have a wireless charger 350, such as an inductive and/or capacitive charging component. In some examples, wireless charger 350 may be configured to temporarily power one or more displays when being charged wirelessly. For example, there may be a wireless charger on a point-of-sales device that can temporarily power one or more displays of device 300 when wireless charger 350 comes in close enough proximity to the point-of-sales device to gather electric potential.

Figure 4:
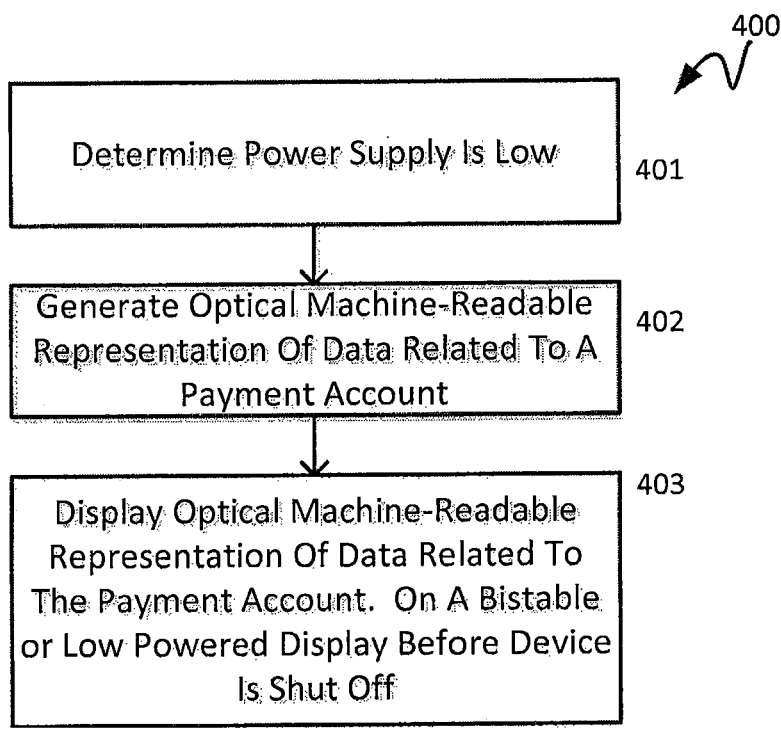
FIG. 4 is a simplified diagram of a method implemented by a user device for enabling secure monetary transactions when unpowered and/or underpowered.

FIG. 4 is a simplified diagram of a method 400 for enabling secure monetary transactions with an unpowered and/or underpowered user device. In some embodiments, method 400 may be implemented with user device 300 of FIG. 5, user device 140 of FIG. 1, and/or computer system 200 of FIG. 2. According to some embodiments, method 400 may include one or more of the processes 401-403 which may be implemented, at least in part, in the form of executable code stored on a non-transitory, tangible, machine readable media that when run on one or more processors (e.g., the processor 212 of FIG. 2) may cause the one or more processors to perform one or more of the processes 401-403.

At process 401, a payment device may determine that a power supply is low and/or below a predetermined charge. In some embodiments, the payment device may determine that a power supply is low by measuring the current draw. In some examples, the payment device may have a battery management system, such as battery management system 149 of FIG. 1, that may monitor the amount of charge stored in the power supply and provide an indication when the power supply is low, near empty, below a predetermined charge, and/or the like. In some examples, a power supply may be considered low or near empty when there is 10% or less battery life left.

At process 402, an optical machine readable representation of data related to a payment account maybe created. This may be in response to the determination that the power supply is low at process 401 and/or that the battery is below a certain charge level. In some embodiments, the optical machine readable representation of data related to a payment account may be unique such that no two generated optical machine readable representation of data related to the payment account are the same. The optical machine readable representation of data may include information such as an account identifier, name, payment settings, an authentication key, date and/or time stamp, account settings, user information, location information (such as a GPS location), biometric signatures (e.g. finger print), and/or the like. In some embodiments, the optical machine readable representation of data may be encrypted to prevent thieves from accessing sensitive user information by retrieving a copy (i.e. a picture) of the optical machine-readable representation of data. In some embodiments, the optical machine-readable representation of data may be generated when the battery power is below a certain charge level, low, and/or the like. In some embodiments, the optical machine-readable representation of data may be generated when the device is about to be shut off or receives a shut off command.

In some embodiments, for the purposes of security, the optical machine readable representation of data may use a pointer to data in a database which includes sensitive or personal information, such as a name, account number, biometric signatures, and/or the like. The database may be maintained and accessible by the payment provided in a manner that prevents unauthorized access. This may reduce the necessity of encrypting the optical machine readable representation of data.

Account settings and/or payment settings may specify use cases, restrictions, payment policies, use policies, use limitation and/or the like for using the optical machine readable representation of data when paying for a product and/or service. For example, a user may set payments using the optical machine readable representation of data to be limited to a certain amount and/or price range. The payment limit may be user specified and/or automatically determined based on the past daily spending amounts by the user (e.g. average spending per day/week/month/year and/or the like). These settings may be conveyed/indicated through the optical machine readable representation of data and/or set on an account managed by a payment provider, such as a payment provider server.

In some examples, the account and/or payment settings may limit the use of the optical machine readable representation of data for purchases at certain stores, of emergency supplies and/or every day necessities (e.g. gas, food, water, groceries, parking, phone calls, bridge/road tolls, transportation, taxi, etc.), and/or the like.

In some embodiments, the account settings and payment setting may be triggered by a certain set of events. For example, the payment device may generate the optical machine readable representation of data when the payment device recognizes that the user is planning to purchase from a particular store or mall, but that the payment device is running out of battery life and/or battery charge. The payment device may predict or establish an expected payment use. For example, the payment device may determine from a grocery list stored on the payment device that the user plans to purchase groceries that day. If and/or when an optical machine-readable representation of data is generated, the payment device may include an indication limiting the use of the optical machine-readable representation of data to grocery stores.

In some examples, the payment device may recognize that the user is within a shopping mall or a retail store. The payment device may have a map application such as Google Maps™ and a location system, such as GPS, from which the payment device may determine that the user is in or near a shopping area. If and/or when an optical machine-readable representation of data is generated, the payment device may include an indication within the optical machine-readable data limiting the use of the optical machine-readable representation of data to the closest store, mall, within a certain distance of a location/gps reading (e.g. within a two mile radius or less), and/or general area.

In some examples, the payment device may include an indication within the optical machine-readable data restricting its use to certain stores that the user frequents. In some embodiments, the stores in which the optical machine-readable data can be used for may be preset and/or preconfigured on the payment device by the user. In some examples, the user device may determine which stores the optical machine-readable data may be used at for purchases based on the purchase history of the user. The user device may create a prediction or an expected payment use based on the purchase history of the user. For example, the optical machine-readable data may include an indicator limiting its use to stores where purchases have been made within a certain time frames, such as the last 30 days.

In some embodiments, some and/or all of the above account setting/user settings may be handled by a payment provider on a remote server. As such, some and/or all of the above features may be implemented without having the indicators inserted in the optical machine-readable data. In other embodiments, the user may set one or more restrictions or limitations.

In some embodiments, the payment device may generate a fake optical machine readable representation of data that indicates that the payment device has been tampered with as part of a theft prevention system. For example, the battery management system of the payment device may indicate that the battery has drained faster than usual and/or in an uncharacteristic fashion. The payment device may determine that a thief is attempting to exploit the payment system by forcing the display of the optical machine readable representation of data related to a payment account through a battery drain. As another example, a thief may attempt to replace a fresh battery with a drained battery in an attempt to exploit the system and force the display of an optical machine readable representation of data for a payment account. The fake optical machine readable representation of data may signal that a particular device and/or account has been compromised. An account server and/or merchant server receiving the signal may take preventive measures, such as notifying an employee of the merchant, locking the payment account or some features of the payment account, notifying the owner (through email, short message service ("SMS"), etc.), notifying a payment provider, bank and/or the like. Notification may be through any form of wired and/or wireless connections to a network, such as network 150. However, in other embodiments, the user may choose to have the payment code generated or displayed even though battery power is not yet low or depleted. Such a situation may occur if the user is anticipating turning the power off the device or about to travel in an area with no Internet, WiFi, or cellular connectivity. In such a case, the user may need to first authenticate through entry of a password, PIN, biometric signature, security questions, and/or the like before the device generates the payment code.

In some embodiments, the optical machine-readable representation of data may be illegible to the general population, but may generate a legible portion with text, characters and/or numbers imbedded into the optical machine-readable data or next to it. The legible portion may be used as an aid for authenticating the user. For example, a security question such as "birthday?", "social security number?", or other security question may be included with the optical machine-readable representation of data for answering. The question may be randomly generated from several security questions, which may have been previously provided by an account holder. The question asked may also be included in the optical machine-readable representation of data to indicate to a payment provider which security question has been asked and/or what the answer to the security question is. A merchant and/or payment provider may have the user enter in the answer to the security question for authenticating payments (e.g. answers entered into a point of sales device). The answer may be verified by the payment provider and/or merchant.

At process 403, the optical machine readable representation of data generated at process 402 may be displayed on a low powered or bistable display of the payment device. In some examples, the optical machine readable representation of data generated at process 402 may be displayed in response to the device being turned off, put into a low powered state, and/or the like. In some embodiments, a low powered state may be a state where most of the normal functionalities of the payment device are disabled, such as Wi-Fi, cellular connection, mobile network connection, power hungry applications, and/or the like. In some embodiments, most of the normal functionalities of the payment device may be considered disabled when at least 50% of the normal functionalities of the payment device when fully powered are disabled. In this manner the optical machine readable representation of data can be used for purchasing goods and/or services.

As discussed above and further emphasized here, FIG. 4 is merely an example which should not unduly limit the scope of the claims. One of ordinary skill in the art would recognize many variations, alternatives, and modifications. According to some embodiments, one or more of the processes 401-403 may be performed in different orders than the order implied in FIG. 4. In some examples, one or more of the process 401-403 may be performed in any order and/or partially or totally in parallel. In some embodiments, one or more process 401-403 may be omitted/ignored.

Figure 5:
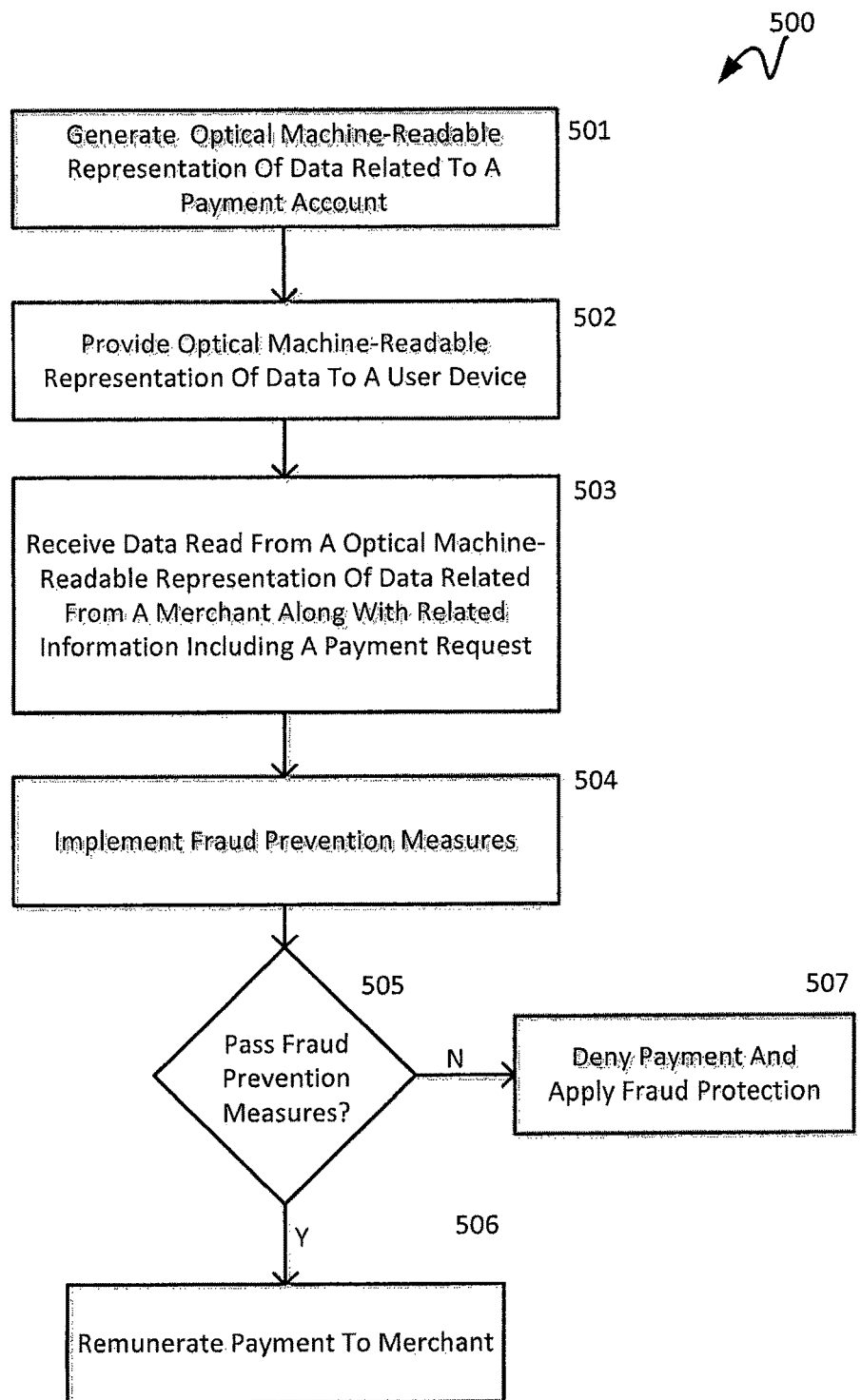
FIG. 5 is a simplified diagram of a method implemented by a system for enabling secure monetary transactions with an unpowered and/or underpowered device.

FIG. 5 is a simplified diagram of a method 500 which may be implemented by a system and/or server for enabling secure monetary transactions using an unpowered and/or underpowered device. In some embodiments, method 500 may be implemented by a device and/or system such as payment provider 120 of FIG. 1 and/or computer system 200 of FIG. 2. In some embodiments, method 500 may be implemented in a system and/or device in conjunction with a user device such as user device 300 of FIG. 3, merchant system 110 and/or user device 140 of FIG. 1. According to some embodiments, method 500 may include one or more of the processes 501-507 which may be implemented, at least in part, in the form of executable code stored on a non-transitory, tangible, machine readable media that when run on one or more processors (e.g., the processor 212 of FIG. 2) may cause the one or more processors to perform one or more of the processes 501-507.

At process 501, the system may generate an optical machine-readable representation of data related to a payment account. The optical machine-readable representation of data may be created in a similar manner as process 402 of FIG. 4. In some embodiments, the system may be in communication with a user account associated with the payment account through a network, such as network 150 of FIG. 1, and the system may retrieve some of the data, such as location information, for creating/embedding into the optical machine-readable representation of data. In some embodiments, the information used to create the optical machine-readable representation of data may be held on the system or on a remote server. Information such as an account identifier, name, payment settings, an authentication key, date and/or time stamp, account settings, user information, biometric signatures, and/or the like. In some embodiments, the optical machine readable representation of data may be encrypted to prevent thieves from accessing sensitive user information by retrieving a copy (i.e. a picture) of the optical machine readable representation of data.

In some embodiments, for the purposes of security, the optical machine readable representation of data may use a pointer to data in a database of the system or a remote server where sensitive or personal information, such as a name, account number, biometric signatures, and/or the like is held. The database may be maintained and accessible by the system in a manner that prevents unauthorized access. This may reduce the necessity of encrypting the optical machine readable representation of data.

At process 502, the system may communicate the optical machine-readable representation of data generated at process 501 to a user device related to the payment account. For example, the device may be registered and/or logged in with the system and in communication through a network connection. In some embodiments, the optical machine-readable representation of data may be sent by email, SMS, and/or other contact methods registered with the system. In some embodiments, the optical machine-readable representation of data may be displayed for printing on a piece of paper.

In some embodiments, process 501 and 502 may be omitted. For example, in some embodiments, a user device, such as user device 140 of FIG. 1 and/or user device 300 of FIG. 3, may generate the optical machine-readable representation of data as described in process 402 of FIG. 4.

At process 503, the system may receive data from a merchant. The data may include data read from an optical machine-readable representation of data and other related information such as a product identifier, device identifier, service identifier, merchant identifier, associated pin/pass code, answer to a security question, biometric signature, date/time stamp, location information, and/or the like. In some embodiments, the optical machine-readable representation of data may have been encrypted such that the data read from the optical machine-readable representation of data received by the system may also be encrypted. In some examples, the system may maintain the key for decrypting the data read from the optical machine-readable representation of data.

In some embodiments, an image of the optical machine-readable representation of data may be received. This may be in lieu of the data read from the optical machine-readable representation of data. This may allow for additional level of security by using a proprietary optical machine-readable representation of data as a form of encryption.

The optical machine-readable representation of data may include extractable information such as account identifying information, date/time stamp, biometric signature, use limitation indicators, fraud indicators, device identification information, and/or the like.

The data received from the merchant may also include a payment request. The payment request may be for a product or service that the merchant is selling to a user. The user may have attempted to purchase the product or service from the merchant using the optical machine readable representation of data for facilitating payments from a payment account.

At process 504, the system may implement and/or execute one or more fraud prevention measures. In some embodiments the fraud preventive measures may be one or more tests and/or series of tests. For example, the system may identify use limitation indicators, restrictions, use policies, payment policies, account settings, and/or payment settings regarding the use of the optical machine-readable representation of data for purchases and/or fund transfers. The limitation and/or restrictions may be used to prevent fraud and/or mitigate damages caused by fraud. The use limitation indicators, restrictions, use policies, payment policies, account settings, and/or payment settings may be provided as part of the optical machine-readable data and/or may be user specified on a payment account handled by the system.

In some embodiments, the optical machine-readable representation of data may be configured to be single use, limited to use within a period of time (e.g. 24 hours, couple days, week, etc.), a specific number of uses (e.g. 10 uses), and/or the like. The optical machine-readable representation of data may include an indicator on the use limitation which a merchant or a payment provider may supervise. For example, the payment provider may maintain a counter counting the number of times an optical machine-readable representation of data is used and/or an expiration date.

In some examples, there may be payment limits based on a received user setting and/or determined through purchase a history (e.g. spending averages), product limitations (e.g. emergency supplies and/or necessities), geographical limitations (city, geographic region, location, area, mall, stores etc.), and/or the like. The limitations may include some of the examples discussed in relation to process 402 in FIG. 4 above. The system may test to see if the optical machine-readable representation of data is being used outside of one or more of these limitations.

In some examples, the system may test for anomalies in the account usage. For example, if the maximum spending on gas for a user on any given day is twenty dollars on regular gas, the system may determine that fifty dollars on premium gas is uncharacteristic of the user. The system may check for other anomalies such as purchases in different cities, purchases at odd/uncharacteristic times of day, spikes in spending, purchases of goods that the user has not purchased before, duplicate purchases, purchases at stores that the user has rarely or never attended, and/or the like. The system may maintain a database containing a purchase history of the user to analyze and test recent purchases against the database.

In some examples, the system may check for a matching PIN, answer to a security question, biometric signature, and/or the like. In some embodiments, the system may check to see if there is a fraud indicator in the optical machine-readable representation of data.

In some examples, the system may receive optical machine-readable data that indicates that the device that generated and/or provided the optical machine-readable data was tampered with and/or hacked. The indication, once extracted, may notify the system that a user device has been compromised and additional preventive measures should be set in place.

At process 505, the system may determine whether the purchase request passed or failed one or more of the above security measures (e.g. usage limitations and/or matching pin/security question answer, biometric signature). If at process 505 it is determined that the fraud prevention measures have successfully been passed, the system may implement process 506. If, at process 505, one or more of the fraud prevention measures, such as the usage limitations, tests, and/or the security checks are not passed, the system may implement process 507.

At process 506 the system may remunerate payment to the merchant. For example, the system may transfer funds from the user account to a merchant account. In some examples, the system may record the transaction for future viewing by the user and/or merchant. In some examples, the system may send notification of the transaction through email, SMS, and/or the like.

At process 507, the payment request from the merchant may be denied. In some embodiments, the system may implement additional fraud protection steps. For example, the system may disable the use of the optical machine-readable representation of data from future purchases. In some examples, the system may remotely disable the device, message the user of the possible fraudulent purchase attempt, and/or inform the merchant of the possibility of an attempted fraudulent purchase. In some examples, the optical machine-readable representation of data may include a device identifier, and the system may prevent or disable the use of any device with the same identifier as a payment device.

In some embodiments, the optical machine-readable representation of data (or payment code) may be displayed on the user device using a "sticker" or other physical medium that adheres or is otherwise attached to the user device. For example, stickers may be supplied to the user from the payment provider or the user may print out stickers from a printer. The stickers display a payment code having the same content and/or format as discussed herein. The stickers may have codes that have different limitations and/or restrictions as discussed above, such that the user may choose which sticker to place on a user device, depending on an anticipated use. In some embodiments, the optical machine-readable representation of data (or payment code) may be printed by a printer and attached to a phone using tape and/or other adhesives.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory; and
   one or more hardware processors coupled to the non-transitory memory and configured to read instructions from the non-transitory memory to cause the system to perform operations comprising:
      detecting a condition limiting a functionality of a first display of a mobile device;
      in response to the detecting, presenting content on a second display of the mobile device; and
      maintaining the presentation of the content on the second display of the mobile device for a period of time while the condition exists.

2. The system of claim 1, wherein the operations further comprise generating the content based on a user account among a plurality of user accounts with a service provider.

3. The system of claim 2, wherein the operations further comprise determining a location of the mobile device, and wherein the generating the content comprises embedding information associated with the location into the content.

4. The system of claim 2, wherein the operations further comprise generating a timestamp corresponding to a time when the condition is detected, and wherein the generating the content comprises embedding the timestamp into the content.

5. The system of claim 1, wherein the content identifies a funding account, and wherein the operations further comprise:
   receiving, from a second device, a transaction request comprising the content;
   identifying the funding account based on the content included in the transaction request; and
   processing the transaction request using information associated with the funding account.

6. The system of claim 5, wherein the operations further comprise:
   extracting location information from the content; and
   determining that a location associated with the second device corresponds to the extracted location information, wherein the transaction request is processed in response to the determining that the location associated with the second device corresponds to the location information extracted from the content.

7. The system of claim 5, wherein the operations further comprise:
   extracting a timestamp from the content; and
   determining that the transaction request is received within a time threshold from a time indicated by the timestamp, wherein the transaction request is processed in response to the determining that the transaction request is received within the time threshold from the time indicated by the timestamp.

8. The system of claim 1, wherein the second display is a bistable display.

9. A method, comprising:
   receiving, by one or more hardware processors, an indication that a functionality of a first display of a user device is limited;
   in response to receiving the indication, causing, by the one or more hardware processors, content to be presented on a second display of the user device, wherein the second display is of a different type than the first display; and
   maintaining the presentation of the content for a period of time while the functionality is limited.

10. The method of claim 9, further comprising generating the content in response to receiving the indication.

11. The method of claim 9, further comprising:
    detecting that the user device has been tampered with; and
    in response to the detecting, modifying the content to indicate that the user device has been tampered with, wherein the modified content is presented on the second display of the user device.

12. The method of claim 11, further comprising:
    receiving, from a second device, a transaction request;
    determining that the transaction request comprises the modified content; and
    in response to determining that the transaction request comprises the modified content, restricting access to a resource associated with the user device.

13. The method of claim 9, wherein the content includes an embedded question, and wherein the method further comprises:
    receiving, from a second device, a transaction request;
    determining that the request comprises the content having the embedded question; and
    causing the second device to display the embedded question.

14. The method of claim 13, wherein the content identifies a user account with a service provider, wherein the method further comprises:
    receiving an answer from the second device;
    validating the answer based on information associated with the user account; and
    in response to validating the answer, processing the transaction request based on the user account.

15. A non-transitory machine-readable medium having stored thereon machine-readable instructions executable to cause a machine to perform operations comprising:
    detecting a condition limiting a functionality of a first display of a mobile device;
    in response to the detecting, presenting content on a second display of the mobile device;
    determining the condition no longer exists; and
    removing the presentation of the content on the second display of the mobile device in response to the determining.

16. The non-transitory machine-readable medium of claim 15, wherein the operations further comprise:
    determining location information representing a location of the mobile device; and
    embedding the location information in the content.

17. The non-transitory machine-readable medium of claim 15, wherein the operations further comprise:
    generating a timestamp corresponding to a time when the condition is detected; and
    embedding the timestamp in the content based on the time.

18. The non-transitory machine-readable medium of claim 15, wherein the content identifies a funding account, and wherein the operations further comprise:
    receiving, from a second device, a transaction request comprising the content;
    identifying the funding account based on the content; and
    processing the transaction request using information associated with the funding account.

19. The non-transitory machine-readable medium of claim 18, wherein the operations further comprise:
    extracting location information from the content; and
    determining that a location associated with the second device corresponds to the location information extracted from the content, wherein the transaction request is processed in response to the determining that the location associated with the second device corresponds to the location information extracted from the content.

20. The non-transitory machine-readable medium of claim 18, wherein the operations further comprise:
    extracting a timestamp from the content; and
    determining that the transaction request is received within a time threshold from a time indicated by the timestamp, and wherein the transaction request is processed in response to the determining that the transaction request is received within the time threshold from the time indicated by the timestamp.

* * * * *